United States Patent [19]

Sturm

[11] 3,943,334

[45] Mar. 9, 1976

[54] HEAT WELDABLE, THERMOPLASTIC FITTING

[75] Inventor: Werner Sturm, Hagendorf, Switzerland

[73] Assignee: Von Roll AG, Gerlafingen, Switzerland

[22] Filed: Mar. 8, 1974

[21] Appl. No.: 449,358

[30] Foreign Application Priority Data

Mar. 14, 1973 Switzerland.......................... 3605/73
Mar. 14, 1973 Switzerland.......................... 3606/73

[52] U.S. Cl. .............. 219/544; 174/84 S; 156/380; 264/272; 219/535; 285/21; 285/292
[51] Int. Cl.² ......................................... H05B 3/58
[58] Field of Search .......... 219/521, 523, 535, 544, 219/449; 425/143, 144, 174, 174.4, 174.6; 264/27, 272, 275, 332; 174/76, 84 R, 84 C, 84 S; 156/86, 275, 293, 380; 285/21, 286, 292, 417

[56] References Cited
UNITED STATES PATENTS

| | | | |
|---|---|---|---|
| 2,739,829 | 3/1956 | Pedlow et al. .......................... | 285/21 |
| 2,845,516 | 7/1958 | Jones.................................. | 174/84 S |
| 2,930,634 | 3/1960 | Merritt................................ | 285/21 |
| 3,061,503 | 10/1962 | Gould et al. .......................... | 156/275 |
| 3,062,940 | 11/1962 | Bauer et al. .......................... | 219/544 |
| 3,094,452 | 6/1963 | Von Riegen et al. ................. | 156/275 |
| 3,304,408 | 2/1967 | Finch et al. ........................... | 219/544 |
| 3,377,464 | 4/1968 | Rolfes............................ | 219/535 X |
| 3,542,402 | 11/1970 | Caples et al. .......................... | 285/21 |
| 3,710,076 | 1/1973 | Frazier................................ | 219/449 |
| 3,771,852 | 11/1973 | Kantorski et al. ............... | 264/272 X |

FOREIGN PATENTS OR APPLICATIONS

| | | | |
|---|---|---|---|
| 1,416,207 | 9/1965 | France.............................. | 285/21 |
| 186,594 | 12/1963 | Sweden............................. | 264/272 |

*Primary Examiner*—Volodymyr Y. Mayewsky
*Attorney, Agent, or Firm*—Flynn & Frishauf

[57] ABSTRACT

To permit efficient heat welding of pipe fittings, and the like, of thermpolastic material to thermoplastic pipes, by electrically heating of the fitting, the fitting is made in two concentric portions, the inner portion having a heating wire applied to the outside thereof, the heating wire and inner portion being covered by the outer portion, for example injected thereover.

10 Claims, 8 Drawing Figures

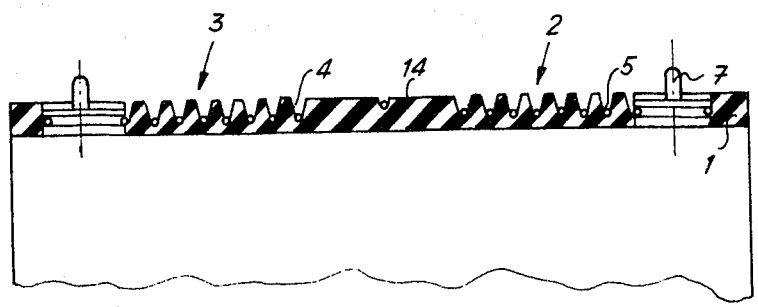
FIG. 2
FIG. 3
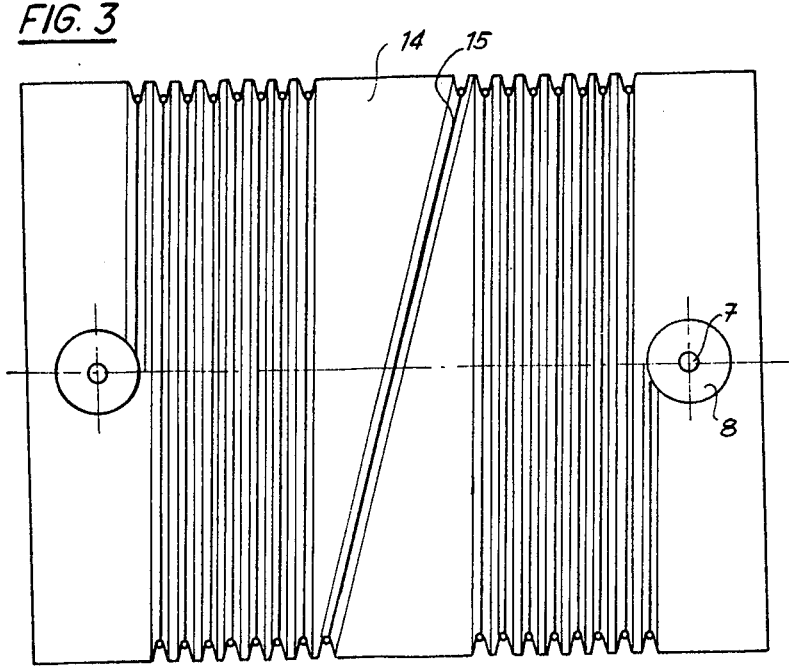

3,943,334

HEAT WELDABLE, THERMOPLASTIC FITTING

The present invention relates to a heat weldable thermoplastic fitting, particularly for use with plastic piping, tubing or the like, and having a, for example, tubular portion adapted to be thermoplastically welded to the plastic pipe or tubing, and to a method of making such fittings.

It has previously been proposed to utilize electrically heatable, weldable, or fusable fittings to connect pipes, tubes, and other elements by means of thermoplastic connecting fittings.

A type of weldable fitting which has been proposed is made by first wrapping a heating wire on a mandrel, around which then thermoplastic material is applied, for example by injection, and then removing the mandrel. The thermoplastic material shrinks considerably, and the electrical wire of the heating winding must accept the shrinkage forces. Upon introduction of the pipe to be connected to the fitting, the edge of the pipe may strike an edge of the heating wire. This may cause dislocation of the heating wire, and canting of the heating wire, due to the high shrinkage forces and stresses in the fiting. The wire may break, and the fitting becomes unusable.

Another type of weldable fitting utilizes a heating wire in which, prior to winding the wire on a mandrel, it is coated or covered with the material of the fitting, or with a similar material. Upon injection of the fitting material, a secure connection will be formed between fitting and coated wire. The wire, therefore, will no longer be subject to damage, and change in position, canting, or other dislocation upon introduction of the pipe, or other element to be connected to the fitting. The injection pressure and the shrinkage of the material in such fittings are counter the pressure of the wire, the wire pressure acting in a direction which is opposite to that caused by shrinkage, as the fitting and the other element are welded together. Upon heating of the fitting, therefore, the heating wires have the tendency to shift position in the interior of the fitting material, so that the welding points, at the location of highest temperature, are more distant from the heating wire than is the case already due to the manufacture of the fitting. This substantially interferes with reliable welding and connection of fitting and welding element.

Deformation of the heating wire and drift, or deviation thereof, within the material of the fitting itself not only detracts from good welding due to the greater distance to the surface to be welded itself; it also has the tendency to expand the weldable fitting, since the material tends to expand with increasing temperature. If the weldable fitting expands in such a manner, the weld will be imperfect, unless a slight amount of play was provided at the welding point or line. Such fittings do have a tendency to shrink, which shrinkage is, however, slight and which may disappear upon extended storage.

It has previously been proposed to weld plastic pipes, other elements and the like with fittings in which a heating ribbon is placed between the parts to be connected, heating of the heating ribbon itself causing the welding connection. This method requires careful handling and the danger of short circuits always exists, since the winding is a bifilar winding.

A fitting has been proposed in which the heating wire is introduced into a groove after the fitting has been made, the groove being placed at the inside of a sleeve-like fitting. The fitting is expanded, while still warm, and then cooled. Upon re-heating, the fitting will have a shrinkage memory, that is, will be capable of later shrinking. The inner windings are bare, not insulated, in order to provide best thermal contact. If line voltage is used, such as 110 or 220 V, connecting such fittings in damp weather, or under moist conditions, is mortally dangerous.

Known fittings, and methods of their applications, were comparatively expensive to make, since it was difficult to automate manufacture, automation being possible only partially.

It is an object of the present invention to provide a weldable thermoplastic fitting which, when heated electrically, provides for reliable welding connection of the parts to be connected, requires minimum tolerances, and can be made rapidly and automatically.

SUBJECT MATTER OF THE PRESENT INVENTION

Briefly, the fitting is formed in two concentric portions. An inner portion has the heating wire applied to the outer circumference thereof, and the inner portion, with the wire applied, is then covered or coated by a second, outer fitting portion.

In accordance with a feature of the invention, the inner portion is first made; the heating wire is then wound on the inner portion, for example would in a groove preformed in the inner portion; the outer material is then applied over the inner portion which has the wire wrapped thereabout.

The invention will be described by way of example with reference to the accompanying drawings, wherein:

FIG. 2 is a fragmentary axial section through the inner fitting portion of the fitting of FIG. 1;

FIG. 3 is a top view of the inner portion of FIG. 2;

Figure 1:
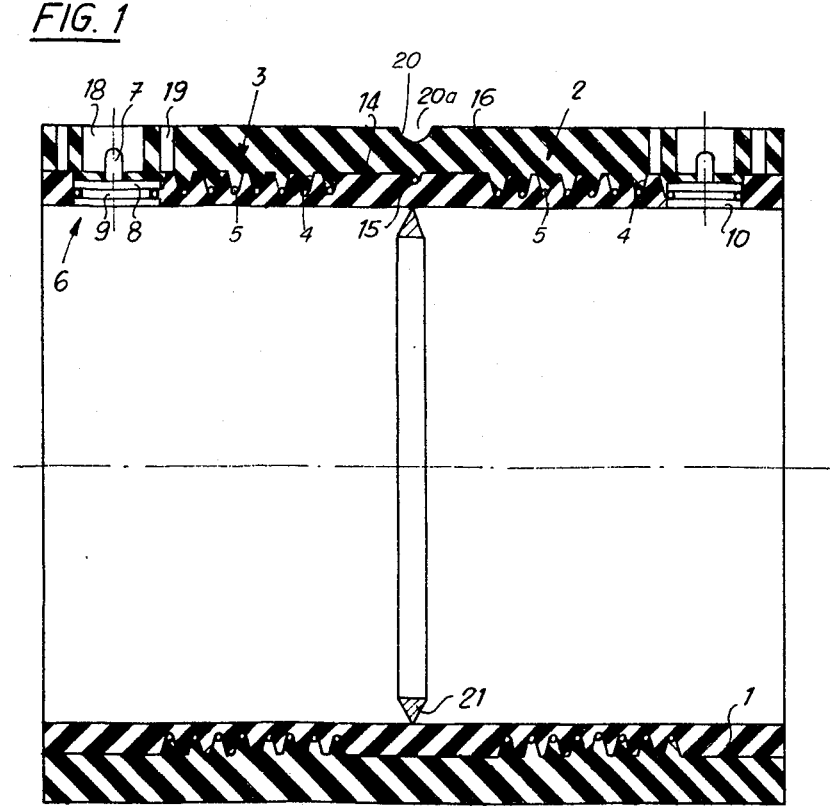
FIG. 1 is an axial section through a coupling fitting to connect thermoplastic pipes, tubes or the like, or a thermoplastic pipe with a fitting element.
Figure 4:
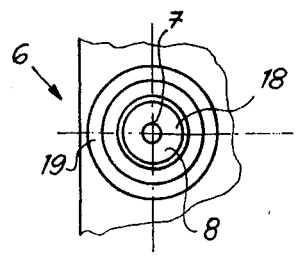
FIG. 4 is a fragmentary top view of the fitting of FIG. 1, showing an electrical connection for the heating wire.

The fitting of FIG. 1 has an inner fitting portion 1. It is formed with two grooved regions 2, 3, in which grooves 4 are formed. The heating wire 5 is located in the grooves. The heating wire 5 is preferably a single, unitary wire, provided at its two ends with an electrical connection 6. The electrical connection 6 can be made in various ways, some of them being shown in FIGS. 4–6. In the embodiment of FIG. 4, the electrical connection 6 is made as a fixed contact pin 7 (FIGS. 1, 4), connected with a disk 8, which is formed with a groove 9 in which the heating wire can be placed. Disk 8 and pin 7 are located in an opening or aperture 10 of the inner fitting portion 1.

Figure 5:
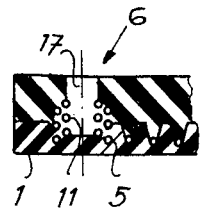
FIG. 5 is a fragmentary axial view through the fitting of FIG. 1, in which the heating wire forms, directly, the electrical connection, which is wound as a bushing.
Figure 6:
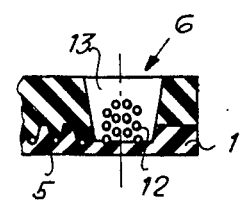
FIG. 6 is a fragmentary axial view through the fitting of FIG. 1, in which the electrical connection is formed as a central contact made of wound heating wire.
Figure 7:
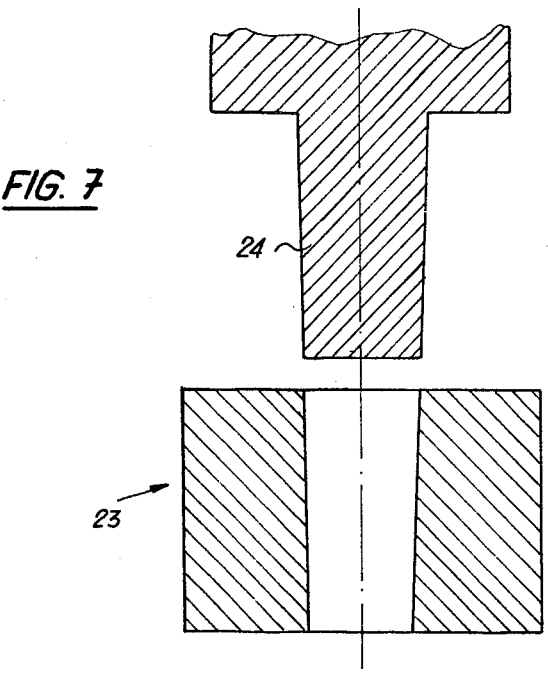
FIG. 7 is a vertical sectional view through a spreading tool to spread the inner fitting portion.

The embodiment of FIGS. 5 and 7 uses electrical contacts formed by the heating wire 5 itself, in which the heating wire 5 is wound in a coil. In FIG. 5, the coil is located at the inner surface of an enlargement at the end of the groove, to form a sleeve or bushing 11, into which a contact pin can be inserted. This contact pin, preferably, is split, so as to have a resiliently deformable outer circumference. FIG. 6 shows an embodiment in which the wire 5 is wrapped closely together to form a closely wrapped contact coil 12, almost as solid as a pin, over which, to make the electrical connection, a bushing or sleeve can be pushed, preferably also resilient deformable, or yielding, for example by being split diametrically. The pin-like coil 12 is retained in a recess 13, surrounding the pin-like coil 12.

It is desirable that the heating wire 5 is located in the grooved parts 2, 3 of the inner portion 1 as close to the inner surface of portion 1 as possible. A central part 14 is located between the parts 2, 3 of the inner portion 1. The heater wire 5 includes a connecting section 15, passing across the central part 14 (see FIG. 3).

The inner portion 1 is preferably injection-molded in the form illustrated in the drawings. Thereafter, the heater wire is wound on the pre-shaped inner portion, by placing wire 5 in the groove. Adjacent turns of the wire 5 are spaced from each other by the ridges between the grooves, so that short circuits between windings of the wire are effectively avoided.

An outer fitting portion 16 surrounds the inner portion 1. Outer portion 16 is, preferably, also injection-molded. It is formed with openings 13 (FIG. 6), 17 (FIG. 5), 18 (FIG. 1, FIG. 4) for the electrical connection. A further groove 19 may be formed in the outer portion 16 (FIGS. 1, 4) to extend the surface adjacent the contacts and thus prevent sneak currents.

The thickness of the wall of the outer portion 16 is decreased above the center part 14 of the inner portion 1, where the wall fits over the heating wire connecting section 15. This weakening, or reduction in diameter may be a groove 20 (FIG. 1). A temperature indicator 20a can be placed in the groove 20, for example a thermo chrome dot, which permits accurate temperature measurement from the outside of the outer fitting portion 16, thus permitting an outside evaluation, and indication when the fitting has reached the necessary temperature to obtain a reliable welding connection.

The inner surface of the inner portion 1 is formed with an abutment 21. This abutment 21 may, for example, be in the form of an inner ring of triangular cross section, with an apex connected to the inner wall of the inner portion 1, so that the connection is by means of a weakened portion, to permit ready removal of the abutment ring 21, if desired. The abutment ring 21 is used to determine the depth of insertion of pipe ends, other fitting ends, or the like, into the fitting. The abutment 21 may be formed as one or more circumferentially distributed segments, or in other shapes.

Figure 8:
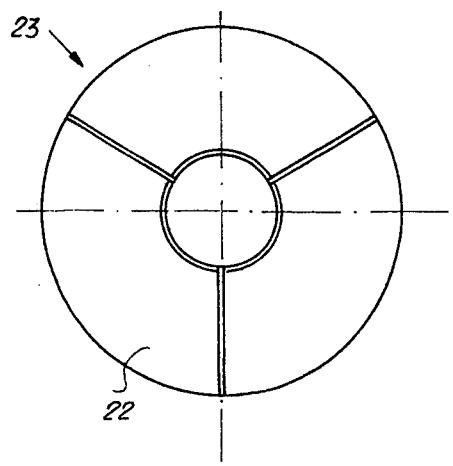
FIG. 8 is an end view of the outer ring of the spreading tool of FIG. 7.

The fitting of FIG. 1 is made by first injection-molding the fitting portion 1, with the grooves formed therein. The electrical heating wire 5 is then wound into the grooves. After molding, and winding the wire on the inner portion 1, the inner portion is expanded by means of an expansion tool illustrated in FIGS. 7 and 8. The wire 5 is thereby stressed in tension. The spreading mandrel is formed as a segmental outer ring 23 and a conically projecting mandrel portion 24. Preferably, two such tools are used for each fitting, one being inserted at each end thereof.

The inner fitting portion 1, thus biassed and expanded, and stressed, is then coated in an injection molding form with the outer portion 16. The fitting so made has high shrinkage capability and securely holds the heating wire close to the inner circumference of the fitting, so that there is good heat transfer between the inner tube, pipe or element, to which the fitting is to be joined, and the fitting itself. A subsequently applied external heat indicator 20a, for example placed in groove 20 (FIG. 1) permits temperature indication, so that poor or erroneous welding is practically impossible.

The inner heating portion 1 may have the same diameter throughout its axial length. It may, however, also have different diameters throughout its axial length, thus acting as reducing or expansion bushings. The outside of the fitting, then, preferably has an indication such as $a+$ or $a-$ sign, which facilitates application of the fitting upon installation in piping. The fitting will have excellent alignment and centering, and will also provide for uniform welding of the connection.

Various changes and modifications may be made within the scope of the invention concept.

The connecting segment 15 of the wire 5 is preferably located close to the outer circumference of the central part 14, to provide good heat transfer to part 6; the groove 4, therefore, has a different depth at the end parts 2, 3, from the depth of the groove in the central part 14, so that the distance for heat heat transfer between the wire 15, in the central part, from the inner circumference of the outer part 16, and then to the surface of the depression 20 becomes a minimum, and accurate temperature determination becomes possible. The grooves may be essentially triangular, as shown, or have different forms or shapes as desired.

I claim:

1. Unitary heat-weldable thermo-plastic fitting for assembly over heat weldable pipe comprising
   an inner part (1) of tubular, thermoplastic material and having an inner diameter corresponding to the outer diamerter of the pipe,
   a heating wire (5) spirally wound about the outer circumference of the inner part and electrically accessible externally of the fitting; an outer part (16) of tubular, thermoplastic material surrounding the inner part and covering the spiral winding (5);
   the inner part (1) being arranged in two axially separated end portions (2, 3) adjacent the ends of the fitting and a central portion (14) connecting the end portions (2, 3);
   the outer circumference of the end portions (2, 3) of the inner part (1) being formed with spirally arranged grooves (4);
   and wherein the wire (5) is located in said grooves (4) and includes a connecting segment (15) connecting the wire in the grooves of said axially separated end portions (2, 3) and passing across the central portion (14).

2. Fitting according to claim 1, wherein the connecting segment (15) of the wire (5) in the region of the central portion (14) is located close to the outer surface of the inner part (1).

3. Fitting according to claim 2, further comprising temperature indicator means (20a) located at the outer circumference of the outer part (16) above the connecting segment (15) of the heater wire (5) and in the region where the heater wire is close to the outer circumference of the inner part.

4. Fitting according to claim 3, wherein the outer part is formed with a depression or decreased wall thickness zone above the connecting segment (15) of the heater wire (5) above the central portion (14) and where the connecting segment is close to the outer circumference of the inner part, to provide for reduced quantity of thermoplastic material of the outer part immediately above at least a part of the connecting segment (15) of the heater wire.

5. Fitting according to claim 1, further comprising electrical connection means (6) at the axial ends of the fitting, located on the inner part (1) and surrounded by material of the outer part (16).

6. Fitting according to claim 5, wherein the contact means comprises a contact pin.

7. Fitting according to claim 5, wherein the contact means comprises a tightly wrapped coil (12) part of the heater wire (5) to form a pin-like projecting contact.

8. Fitting according to claim 5, wherein the contact means comprises a widely spaced coil (11), at least the inner part (1) being formed with a recess (13, 17, 18), the coil bearing against the inner circumference of the recess, to provide for an outer circumferential contact to receive a contact pin for electrical connection to the heater wire.

9. Fitting according to claim 1, wherein the inner wall of the inner part (1) is formed with an inwardly projecting abutment (21) having a weakened shear connection with the inner wall of the inner part (1).

10. Fitting according to claim 1, wherein the inner part (1) has a variable inner diameter along its axial length.

* * * * *